United States Patent
Chakrabarty et al.

(10) Patent No.: US 10,000,998 B2
(45) Date of Patent: Jun. 19, 2018

(54) RECOVERY FROM A HYDROCARBON RESERVOIR

(71) Applicants: Tapantosh Chakrabarty, Calgary (CA); George R. Scott, Calgary (CA)

(72) Inventors: Tapantosh Chakrabarty, Calgary (CA); George R. Scott, Calgary (CA)

(73) Assignee: ExxonMobil Upstream Research Company, Spring, TX (US)

( * ) Notice: Subject to any disclaimer, the term of this patent is extended or adjusted under 35 U.S.C. 154(b) by 408 days.

(21) Appl. No.: 14/521,369

(22) Filed: Oct. 22, 2014

(65) Prior Publication Data

US 2015/0176382 A1 Jun. 25, 2015

(30) Foreign Application Priority Data

Dec. 19, 2013 (CA) ..................................... 2837475

(51) Int. Cl.
*E21B 43/24* (2006.01)
*C09K 8/592* (2006.01)
(Continued)

(52) U.S. Cl.
CPC .............. *E21B 43/24* (2013.01); *C09K 8/592* (2013.01); *E21B 43/2406* (2013.01);
(Continued)

(58) Field of Classification Search
CPC .... E21B 43/24; E21B 43/2406; E21B 49/008; C09K 8/592
See application file for complete search history.

(56) References Cited

U.S. PATENT DOCUMENTS

| 4,166,503 A | * | 9/1979 | Hall ........................ E21B 43/30 166/245 |
| 4,344,485 A | | 8/1982 | Butler ........................... 166/271 |

(Continued)

FOREIGN PATENT DOCUMENTS

| CA | 1304287 | 6/1992 | ............. E21B 43/24 |
| CA | 2785871 | 8/2001 | ........... E21B 43/241 |

(Continued)

OTHER PUBLICATIONS

Hansen, Charles M. (2007) *Hansen Solubility Parameters: A User's Handbook*, CRC Press, Taylor & Francis Group LLC, ISBN 10:0-8493-7248-8, pp. 4-6, 205-206 and 347-389.

(Continued)

*Primary Examiner* — Catherine Loikith
(74) *Attorney, Agent, or Firm* — ExxonMobil Upstream Research Company—Law Department

(57) ABSTRACT

A method of establishing fluid communication between a first point and a second point within a subterranean reservoir includes injecting a first penetrating liquid at a first injection pressure and at a first injection temperature into the subterranean reservoir at the first point, and establishing fluid communication through a heavy-oil containing region by allowing the first penetrating liquid to penetrate into and completely through the heavy-oil containing region between the first point and the second point. The first penetrating liquid temperature of the first penetrating liquid remains at or below the first injection temperature within the subterranean reservoir, and the first penetrating liquid is configured to dilute heavy oil, and comprises a first penetrating liquid polar compound that is at least partially miscible with water.

29 Claims, 3 Drawing Sheets

(51) Int. Cl.
*E21B 43/30* (2006.01)
*E21B 49/08* (2006.01)
*C09K 8/62* (2006.01)

(52) U.S. Cl.
CPC ............ *E21B 43/30* (2013.01); *E21B 49/087* (2013.01); *C09K 8/62* (2013.01)

(56) References Cited

U.S. PATENT DOCUMENTS

| | | | |
|---|---|---|---|
| 5,215,146 A | 6/1993 | Sanchez | 166/263 |
| 5,607,016 A | 3/1997 | Butler | 166/263 |
| 5,899,274 A | 5/1999 | Frauenfeld et al. | 166/401 |
| 6,230,814 B1 | 5/2001 | Nasr et al. | 166/400 |
| 6,591,908 B2 | 7/2003 | Nasr | 166/272.3 |
| 6,883,607 B2 | 4/2005 | Nenniger et al. | 166/272.4 |
| 7,363,973 B2 | 4/2008 | Nenniger et al. | 166/272.4 |
| 7,527,096 B2 | 5/2009 | Chung et al. | 166/268 |
| 7,556,099 B2 | 7/2009 | Arthur et al. | 166/272.3 |
| 7,717,175 B2 | 5/2010 | Chung et al. | 166/268 |
| 8,256,511 B2 * | 9/2012 | Boone | C09K 8/58 166/266 |
| 2007/0168170 A1 | 7/2007 | Thomas | 703/10 |
| 2010/0276140 A1 | 11/2010 | Edmunds et al. | 166/272.3 |
| 2010/0294488 A1 | 11/2010 | Wheeler et al. | 166/248 |
| 2011/0174488 A1 | 7/2011 | Morris et al. | 166/305.1 |
| 2012/0037363 A1 * | 2/2012 | Curole | C09K 8/58 166/270 |
| 2012/0048382 A1 | 3/2012 | James | 137/1 |
| 2012/0059640 A1 | 3/2012 | Roy et al. | 703/10 |
| 2012/0085537 A1 | 4/2012 | Banerjee et al. | 166/272.3 |
| 2012/0205096 A1 * | 8/2012 | Chhina | E21B 43/166 166/245 |
| 2012/0325470 A1 | 12/2012 | Gupta et al. | 166/272.3 |
| 2013/0045902 A1 | 2/2013 | Thompson et al. | 507/261 |
| 2013/0146285 A1 | 6/2013 | Chhina et al. | 166/268 |

FOREIGN PATENT DOCUMENTS

| | | | |
|---|---|---|---|
| CA | 2250648 | 9/2002 | E21B 43/24 |
| CA | 2147079 | 10/2006 | E21B 43/16 |
| CA | 2655852 | 4/2010 | C10G 1/00 |
| CA | 2697417 | 9/2010 | E21B 43/24 |
| CA | 2698898 | 7/2011 | E21B 43/22 |
| CA | 2740941 | 11/2012 | E21B 43/16 |
| CA | 2778135 | 11/2012 | E21B 43/241 |
| CA | 2766838 | 8/2013 | E21B 43/16 |
| WO | WO1999/067503 | 12/1999 | E21B 43/24 |
| WO | WO2012/037147 | 3/2012 | E21B 43/24 |
| WO | WO2012/121711 | 9/2012 | E21B 43/24 |
| WO | WO2013/071434 | 5/2013 | E21B 43/24 |

OTHER PUBLICATIONS

Hansen, Charles M. (2007) *Hansen Solubility Parameters: A User's Handbook,* CRC Press, Taylor & Francis Group LLC, ISBN 10:0-8493-7248-8, pp. 390-439.

Hansen, Charles M. (2007) *Hansen Solubility Parameters: A User's Handbook,* CRC Press, Taylor & Francis Group LLC, ISBN 10:0-8493-7248-8, pp. 440-482.

Harrison, Lynda (2012) "Cenovus seeks use of oil sands start-up boosting technologies" *New Technology Magazine.*

* cited by examiner

RECOVERY FROM A HYDROCARBON RESERVOIR

CROSS REFERENCE TO RELATED APPLICATIONS

This application claims priority from Canadian Patent Application number 2,837,475 which was filed on Dec. 19, 2013, entitled IMPROVING RECOVERY FROM A HYDROCARBON RESERVOIR, which is incorporated herein by reference.

FIELD

The present methods relate to recovery of heavy oils from subterranean reservoirs. More specifically, the methods relate to start-up phases for heavy oil recovery processes to prepare subterranean reservoirs for effective heavy oil recovery.

BACKGROUND

This section is intended to introduce various aspects of the art. This discussion is believed to assist in providing a framework to facilitate a better understanding of particular aspects of the present techniques. Accordingly, it should be understood that this section should be read in this light, and not necessarily as admissions of prior art.

Modern society is greatly dependent on the use of hydrocarbons for fuels and chemical feedstocks. Hydrocarbons are generally found in subsurface rock formations that can be termed "reservoirs." Removing hydrocarbons from the reservoirs depends on numerous physical properties of the reservoirs, such as the permeability of the formations containing the hydrocarbons, the ability of the hydrocarbons to flow through the formations, and/or the proportion of hydrocarbons present, among other things.

Easily produced sources of hydrocarbon are dwindling, leaving less conventional sources to satisfy future energy needs. As the costs of hydrocarbons increase, less conventional sources become more economically attractive to produce. For example, the production of oil sands has become more economical. The hydrocarbons produced from less conventional sources may have relatively high viscosities, for example, ranging from 1000 centipoise (cP) to 20 million cP American Petroleum Institute (API) densities ranging from 8° API, or lower, up to 20° API, or higher. The hydrocarbons harvested from less conventional sources may include bitumen, or other carbonaceous materials, collectively referred to herein as "heavy oil." The hydrocarbons produced from less conventional sources are difficult to recover using conventional techniques.

Several methods have been developed to recover heavy oil from, for example, oil sands. Strip or surface mining may be performed to access oil sands. Once accessed, the oil sands may be treated with hot water or steam to extract the heavy oil. For formations where heavy oil is not close to the Earth's surface, heat may be added and/or dilution may be used to reduce the viscosity of the heavy oil and recover the heavy oil. Heat may be supplied through a heating agent like steam. The recovered heavy oil may or may not be produced via a production well or wellbore. The production well or wellbore may be the same as the wellbore used to inject the heat for the steam injection. If the heating agent is steam, the steam may condense to water at the steam/cooler-oil-sands (SCO) interface in the formation and supply latent heat of condensation to heat the heavy oil in the oil sands, thereby reducing viscosity of the heavy oil and causing the heavy oil to flow more easily.

A number of steam-based heavy oil processes have been developed for recovering heavy oil. The processes may include, for example, cyclic steam stimulation (CSS), steam flooding, steam-assisted gravity drainage (SAGD), and solvent-assisted steam-assisted gravity drainage (SA-SAGD).

SAGD is a process where two horizontal wells may be completed in the reservoir. The two wells may be first drilled vertically to different depths within the reservoir. Thereafter, using directional drilling technology, the two wells may be extended in the horizontal direction that results in two horizontal wells, each vertically spaced from, but otherwise vertically aligned with, the other. Ideally, the production well may be located above the base of the reservoir but as close as practical to the base of the reservoir, and the injection well may be located vertically 10 to 30 feet (3 to 10 meters) above the horizontal production well. The upper horizontal well may be utilized as an injection well and may be supplied with steam from the surface. The steam may rise from the injection well, permeating through the reservoir to form a vapor chamber (steam chamber). As the vapor chamber grows over time towards the top of the reservoir, the steam may condense at the SCO interface, releasing latent heat of steam and, thereby reducing the viscosity of the heavy oil in the reservoir. The heavy oil and condensed steam may then drain downward through the reservoir under the action of gravity and flow into the lower production well, from where the heavy oil and condensed steam can be pumped to the surface. At the surface of the well, the condensed steam and heavy oil may be separated, and the heavy oil may be diluted with appropriate light hydrocarbons for transportation by pipeline. SAGD processes are described in Canadian Patent No. 1,304,287 and in U.S. Pat. No. 4,344,485.

Before commencing a steam-based heavy oil recovery process, a start-up phase may occur. The start-up phase may condition the reservoir for heavy oil extraction and production by the steam-based heavy oil recovery process. Without a start-up phase, heavy oil may be viscous and immobile. Consequently, it may be difficult for an extraction fluid to penetrate a heavy-oil containing region, containing the heavy oil, to the extent required for a steam-based heavy oil recovery process.

A "water-wet" reservoir is a reservoir that contains water. In water-wet reservoirs, a thin film of water may cover the rock fabric of the reservoir or sand grains. The heavy oil may be located within the pore space and therefore surrounded by the water or the water may be surrounded by the heavy oil. Typically, in reservoirs targeted for heavy oil extraction by a steam-based heavy oil recovery process, the overall pore space will contain 60 to 90% oil and 40 to 10% water, by volume. The presence of the water can interfere with the extraction process until conditioning start-up phase or other conditioning process of the reservoir occurs.

When the steam-based heavy oil recovery process is for example, SAGD, the start-up phase may include preliminary heating the formation by steam. SAGD wellbores may be drilled. Surface facilities and infrastructure required for the injection of steam and production of fluids may be constructed. The time delay between the drilling of the wellbores and the ability to start steam generation can vary from several months (e.g., 6-9 months) to two or more years. After the time delay, the start-up phase may begin, but may then require a period of three (or more) months for completion of the start-up phase. The delay may cause undesirable economics and loss of opportunity. The delay may require the provision of specialized controls, valves, pipes, etc., for the start-up phase. The specialized controls, valves, pipes, etc. may not be needed for SAGD. SAGD, much like any other steam-based heavy oil recovery process, occurs after any start-up phase.

Some start-up phases for SAGD use heat circulation. For example, steam and surfactant may be used to create a foam, as disclosed in U.S. Pat. No. 5,215,146, a heated fluid may be injected, as disclosed in WO 1999/067503 or CA 2,697,417, or the wellbores may be presoaked as disclosed in WO 2012/037147 or US 2011/0174488.

Another start-up phase for SAGD, disclosed in CA 2,766,838, discloses wellbore pair configured to force an initial fluid communication between the production wellbore and the injection wellbore to occur at a selected region along the production wellbore and injection wellbore.

Another start-up phase for SAGD, disclosed in CA 2,740,941, discloses relying on the injection of a start-up fluid at elevated pressures in the injection wellbore. A production wellbore is used to create a pressure sink (voidage) to maximize the available pressure gradient between the production and injection wellbores and as a result help draw the start-up fluid towards the production wellbore. The process is applied only after the production wellbore has been completed with production tubing, artificial lift has been installed or is operational, a way to measure the reproduced start-up fluid is available and a way to store or transport the produced fluids once they are produced to surface is available. The volume of start-up fluid required is substantial, with the representative calculations suggesting required start-up fluid volumes of 500-18,000 meters cubed (m3) to treat a single wellbore pair. A single wellbore pair includes a single production wellbore and a single injection wellbore.

WO 2012/121711 discloses delivering only a small reduction in the time duration of the start-up phase time requirements and no real capital cost reduction benefits as the equipment required to circulate steam in the extraction process of heavy oil must be in place before the start-up phase. WO 2012/121711 discloses fluid circulation followed by a "squeeze step" (described as the shut-off of fluid returns in a wellbore and the inspection of an increase in fluid production at another wellbore). WO 2012/121711 discloses that oil production can only occur after the successful completion of three steps, namely solvent circulation, steam circulation and steam squeeze.

WO 2013/071434 discloses that in order to accelerate the start-up phase of a SAGD wellbore pair, it is preferable to establish a physical connection between the injection and production wellbores. The physical connection can be established by: (1) drilling the injection and production wellbores such that the toes of wellbores intercept; (2) drilling a vertical wellbore that intercepts the toe locations of the injection and production wellbores (creating the physical connection via it's wellbore); or (3) propagating a fracture between the toe locations of the injection and production wellbores. Thus, WO 2013/071434 discloses that, by creating a physical connection (or a high permeability path by fracturing), it is possible to create a continuous unidirectional pathway between the injection and production wellbores for the heated fluids used to start-up the wellbores. At the end of the start-up phase, it may then be necessary to plug the intersection point connecting the injection and production wellbores. Hence, the start-up phase disclosed in WO 2013/071434 is complex and expensive to implement. The start-up phase disclosed in WO 2013/071434 is unlikely to maintain the required mechanical integrity for the entire duration of the start-up phase.

CA 2,698,898 discloses a method of initiating or accelerating fluid communication between horizontal wellbores located in a formation of very limited fluid mobility at start-up. A selected amount of a solvent such as xylene, benzene, toluene or phenol, is injected at sub-fracturing conditions and ambient temperature into a first of the wellbores. The method may be employed for a start-up phase for the recovery of heavy oil using, for example, steam assist gravity drainage.

The present disclosure provides methods for reducing the duration of the start-up phase for steam-based heavy oil recovery processes so that these processes can more quickly recover heavy oil. It is economically advantageous to reduce the start-up phase time for steam-based heavy oil processes.

SUMMARY

The present disclosure provides establishing fluid communication between first and second points, among other things.

A method of establishing fluid communication between a first point and a second point, within a subterranean reservoir, separated by a heavy-oil containing region that enables heavy-oil production by a steam-based heavy oil process, comprises injecting a first penetrating liquid at a first injection pressure and at a first injection temperature into the subterranean reservoir at the first point, and establishing fluid communication through the heavy-oil containing region by allowing the first penetrating liquid to penetrate into and completely through the heavy-oil containing region between the first point and the second point. The first penetrating liquid temperature of the first penetrating liquid remains at or below the first injection temperature within the subterranean reservoir, and the first penetrating liquid is configured to dilute heavy oil, and comprises a first penetrating liquid polar compound that is at least partially miscible with water.

A method of establishing fluid communication between a first point and a second point within a subterranean reservoir, separated by a heavy-oil containing region that enables heavy-oil production by a steam-assisted gravity drainage process, comprises completing wellbores in the subterranean reservoir, the wellbores positioned with the heavy-oil containing region lying between the wellbores and configured for production of heavy oil by a steam-assisted gravity drainage process, and injecting a first penetrating liquid at a first injection pressure and at a first injection temperature into the subterranean reservoir via one of the wellbores, establishing fluid communication through the heavy-oil containing region by allowing the first penetrating liquid to penetrate into and completely through the heavy-oil containing region. A first penetrating liquid temperature of the first penetrating liquid remains at the first injection temperature within the subterranean reservoir, is configured to dilute heavy oil, and comprises a first penetrating liquid polar compound that is at least partially miscible with water.

A method of assessing a subterranean reservoir for suitability for heavy oil production by a solvent-based production process, comprises completing wellbores into the subterranean reservoir, the wellbores positioned with a heavy-oil containing region lying between the wellbores, injecting a first penetrating liquid at a first injection pressure and at a first injection temperature into the subterranean reservoir via one of the wellbores, allowing the first penetrating liquid to remain in contact with the heavy-oil containing region for a predetermined period of time, the first penetrating liquid configured to dilute heavy oil and comprising a polar compound that is at least partially miscible with water, determining an occurrence of penetration of the first penetrating liquid through the heavy-oil containing region, and declaring the subterranean reservoir suitable for heavy oil production by a solvent-based production process only if the occurrence is determined within the predetermined period of time.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the present disclosure will become apparent from the following description, appending claims and the accompanying drawings, which are briefly described below.

Figure 1:
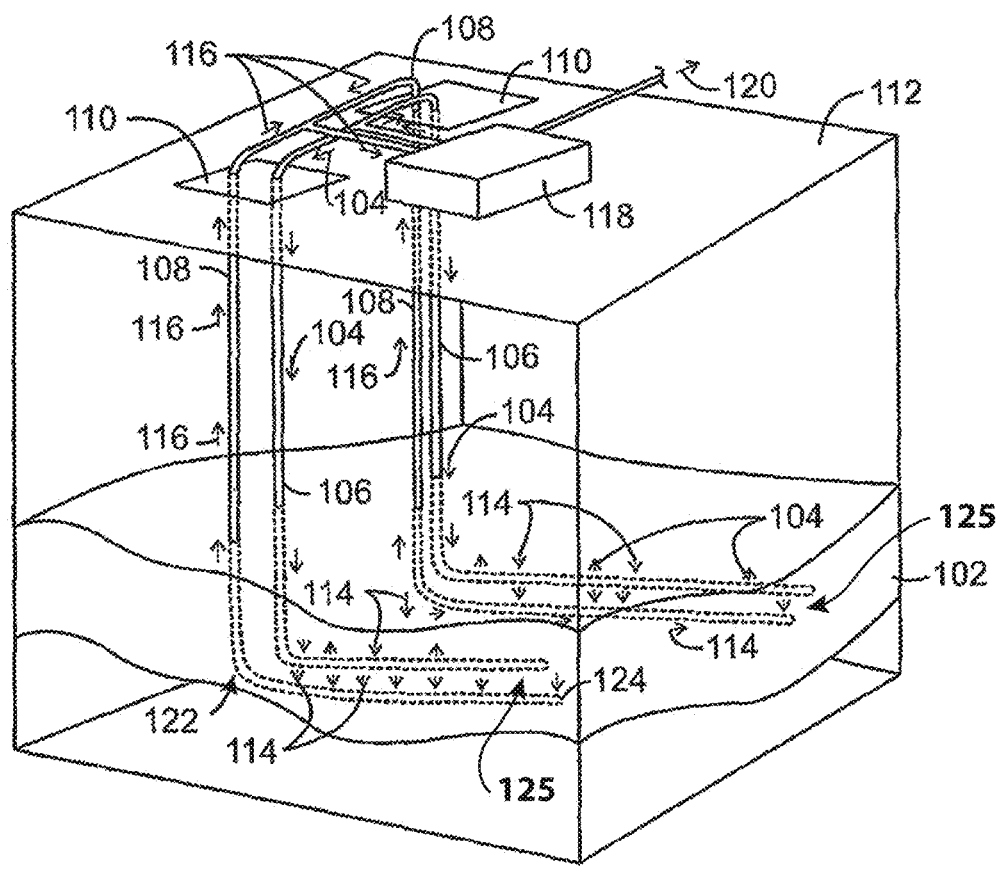
FIG. 1 is a drawing of a steam assisted gravity drainage (SAGD) process.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of: 19 weight (wt.) % aliphatics (which can range from 5 wt. %-30 wt. %, or higher); 19 wt. % asphaltenes (which can range from 5 wt. %-30 wt. %, or higher); 30 wt. % aromatics (which can range from 15 wt. %-50 wt. %, or higher); 32 wt. % resins (which can range from 15 wt. %-50 wt. %, or higher); and some amount of sulfur (which can range in excess of 7 wt. %). In addition bitumen can contain some water and nitrogen compounds ranging from less than 0.4 wt. % to in excess of 0.7 wt. %. The metals content, while small, must be removed to avoid contamination of the product synthetic crude oil. Nickel can vary from less than 75 part per million (ppm) to more than 200 ppm. Vanadium can range from less than 200 ppm to more than 500 ppm. The percentage of the hydrocarbon types found in bitumen can vary.

As used herein, two locations in a reservoir are in "fluid communication" when a path for fluid flow exists between the two locations. For example, fluid communication fluid communication between an injection well and a production well can allow mobilized material to flow down to the production wellbore for collection and production. As used herein, a fluid includes a gas or a liquid and may include, for example, a produced or native reservoir hydrocarbon, an injected mobilizing fluid, or water, among other materials.

"Facility", is a tangible piece of physical equipment through which hydrocarbon fluids are either produced from a reservoir or injected into a reservoir, or equipment which can be used to control production or completion operations. In its broadest sense, the term facility is applied to any equipment that may be present along the flow path between a reservoir and its delivery outlets. Facilities may comprise production wellbores, injection wellbores, wellbore tubulars, wellbore head equipment, gathering lines, manifolds, pumps, compressors, separators, surface flow lines, steam generation plants, processing plants, and delivery outlets. In some instances, the term "surface facility" is used to distinguish those facilities other than wellbores.

"Heavy oil" includes oils which are classified by the API, as heavy oils, extra heavy oils, or bitumens. Thus the term "heavy oil" includes bitumen and should be regarded as such throughout this description. Heavy oil may have a viscosity of about 1,000 centipoise (cP) or more, 10,000 cP or more, 100,000 cP or more, or 1,000,000 cP or more. In general, a heavy oil has an API gravity between 22.30 (density of 920 kilogram per meter cubed ($kg/m^3$) or 0.920 gram per centimeter cubed ($g/cm^3$)) and 10.00 (density of 1,000 $kg/m^3$ or 1 gram per centimeter (g/cm)). An extra heavy oil, in general, has an API gravity of less than 10.00 (density greater than 1,000 $kg/m^3$ or greater than 1 g/cm). For example, a source of heavy oil includes oil sand or bituminous sand, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker and therefore directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in heavy oil or in oil sands. However, the techniques described herein are not limited to heavy oils, but may also be used with any number of other reservoirs to improve gravity drainage of liquids. Hydrocarbon compounds may be aliphatic or aromatic, and may be straight chained, branched, or partially or fully cyclic.

"Permeability" is the capacity of a rock to transmit fluids through the interconnected pore spaces of the structure. The customary unit of measurement for permeability is the milliDarcy (mD).

"Pressure" is the force exerted per unit area by the gas on the walls of the volume. Pressure can be shown as pounds per square inch (psi), kilopascals (kPa) or megapascals (MPa). "Atmospheric pressure" refers to the local pressure of the air. "Absolute pressure" (psia) refers to the sum of the atmospheric pressure (14.7 psia at standard conditions) plus the gauge pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

As used herein, a "reservoir" is a subsurface rock or sand formation from which a production fluid, or resource, can be harvested. The formation may include sand, granite, silica, carbonates, clays, and organic matter, such as heavy oil (e.g., bitumen), oil, gas, or coal, among others. Reservoirs can vary in thickness from less than one foot (0.3048 meter (m)) to hundreds of feet (hundreds of meter). The resource is generally a hydrocarbon, such as a heavy oil impregnated a sand bed.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Hansen Solubility Parameters (HSP) are described, for example, in the *Hansen Solubility Parameters: A User's Handbook*, by Charles M. Hansen, CRC Press, Taylor & Francis Group LLC, ISBN 10:0-8493-7248-8, 2007 (the disclosure of which is incorporated herein by reference). Materials having similar HSP values have a high affinity for each other. There are three major interactions in common organic materials, i.e. nonpolar (dispersive) interactions, permanent dipole (polar) interactions and hydrogen bonding. Specifically, for HSP, each molecule is assigned three Hansen parameters as follows, each generally measured in $MPa^{0.5}$ at 25 degrees Celsius (° C.):

$\delta_d$ the energy from dispersion forces between molecules (usually referred to by the letter "D");

$\delta_p$ the energy from dipolar intermolecular force between molecules (usually referred to by the letter "P"); and $\delta_h$ the energy from hydrogen bonds between molecules (usually referred to by the letter "H").

For common chemicals, the values of D, P and H are known. For mixtures of chemicals, HSP values may be ascribed to the mixtures themselves and are calculated from the values for the individual chemicals on a volume-averaged basis. In other words, the volume averaged basis may be defined as the weighted average of the individual HSP values according to the respective volume percent of each solvent. The amount of individual HSP values used to determine the weighted average could be any amount of HSP values. For example, the amount of individual HSP values used to determine the weighted average could be based on 2 or more HSP values.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "wellbore," when referring to an opening in the rock formation, may be used interchangeably with the term "wellbore." Further, multiple pipes may be inserted into a single wellbore, for example, as a liner configured to allow flow from an outer chamber to an inner chamber.

In the following description, as an example, reference is made to a start-up phase for a steam-assisted gravity drainage process of producing heavy oil from oil sands. For better understanding, a brief explanation of a steam assisted gravity drainage process is provided below.

FIG. 1 is a drawing of a SAGD process 100 used for accessing hydrocarbons in a subterranean reservoir 102. In the SAGD process 100, steam 104 can be injected through an injection wellbore 106 to the reservoir 102. The injection wellbore 106 may be vertically and horizontally drilled through the reservoir 102 as shown. A production wellbore 108 may be drilled vertically and horizontally through the reservoir 102. A production wellbore 108 may lie below an injection wellbore 106. Specifically, a horizontal section of a production wellbore 108 may lay below a horizontal section of an injection wellbore 106. The injection wellbore 106 and production wellbore 108 may be drilled from the same pad 110 at a surface 112 or from a different pad 110 at the surface 112. The surface 112 may be a surface of the subterranean reservoir 102. Drilling the injection wellbore 106 and production wellbore 108 from the same pad may make it easier for the production wellbore 108 to track the injection wellbore 106. The injection and production wellbores may be vertically separated by about 3 to 10 m. For example, the injection and production wellbores may be vertically separated by about 5 m. The injection and production wellbores may be vertically separated by the aforementioned amounts in the horizontal and/or vertical sections of the respective injection and production wellbores. Any of the aforementioned ranges may be within a range that includes or is bounded by any of the preceding examples.

The injection of steam 104 into the injection wellbore 106 may result in the mobilization of heavy oil 114. The mobilized heavy oil 114 may drain to the production wellbore 108. The mobilized heavy oil 114 may then be removed to the surface 112 in a mixed stream 116 that may contain heavy oil, condensate and other materials, such as water, gases, and the like. Sand filters may be used in the production wellbore 108 to decrease sand entrainment.

The injection wellbore 106 may comprise injection wellbores. The production wellbore 108 may comprise production wellbores. If the production wellbore 108 comprises production wellbores, the mixed stream 116 from the production wellbores may be combined and sent to a processing facility 118. If the production wellbore 108 comprises a single wellbore, the mixed stream 116 may be sent to the processing facility 118. At the processing facility 118, the mixed stream may be separated. The heavy oil 120 in the mixed stream may be sent on for further refining. The steam in the mixed stream may be recycled to a steam generation unit within the processing facility 118, with or without further treatment, and used to generate the steam 104 used for the SAGD process 100.

The production wellbore 108 may have a segment that is relatively flat, which, in some developments, may have a slight upward slope from a heel 122, at which the pipe branches to the surface, to toe 124, at which the production wellbore 108 ends. When present, an upward slope of the horizontal segment may result in the toe 124 being around one to five meters higher than the heel 122, depending on the length of the horizontal segment. The upward slope can assist in draining fluids that enter the horizontal segment to the heel 122 for removal.

The injection wellbore 106 may be of similar configuration to the production wellbore 108. That is to say, the injection wellbore 106 may have a segment that is relatively flat, which, in some developments, may have a slight upward slope from a heel, at which the pipe branches to the surface, to toe, at which the injection wellbore 106 ends. When present, an upward slope of the horizontal segment may result in the toe being around one to five meters higher than the heel, depending on the length of the horizontal segment. By configuring the injection wellbore 106 in the same way or in a similar way as the production wellbore 108, the distance between the injection wellbore and the production wellbore may be consistent along the relatively flat portions of the injection wellbore and the production wellbore.

Although the injection wellbore 106 may receive the injected fluid (e.g. steam, solvent), the production wellbore 108 may also receive the injected fluid or may receive the injected fluid instead of the injection wellbore 106.

In a subterranean reservoir containing heavy oil, the high viscosity of the heavy oil within the subterranean reservoir may prevent the heavy oil from being mobilized into a production wellbore. Before a SAGD process of the above kind can be carried out effectively to produce heavy oil, fluid communication between the SAGD wellbore pairs may need to be established so that a fluid injected into the injection wellbore may flow through the subterranean reservoir. Establishing the fluid communication may occur during a start-up phase. The flow of the fluid injected may increase a temperature and mobility of the heavy oil so that the heavy oil drains into the production wellbore for production. In other words, following the start-up phase that creates the fluid communication between the prediction and injection wellbores, steam may penetrate from an injection wellbore through the subterranean reservoir and thereby mobilize the heavy oil by heat and pressure so that it may flow to the production wellbore and be produced.

While it is possible to use steam to establish fluid communication during a start-up phase to heat the subterranean reservoir by heat conduction and therefore to reduce the viscosity of the heavy oil and enable it to be mobilized under pressure, steam is typically not available at a production site for many months or even years after the drilling of wellbores. The unavailability may occur because a steam-generating facility may require a longer time to be built than the drilling of injection and production wellbores.

Even when steam becomes available, a start-up phase employing steam may require several additional months before effective heavy oil extraction by SAGD may be commenced. Effective heavy oil extraction occurs when the viscosity of the heavy oil has been reduced enough for the heavy oil to be produced. The temperature of the heavy-oil containing region between the wellbores must be raised sufficiently high (e.g., from 50 to 100° C.) to allow heavy oil extraction to occur (e.g., for the heavy oil to become sufficiently mobile). The raising of the temperature to a sufficiently high temperature may take time, e.g., 2 to 4 months. The use of steam for the start-up phase may require investment in additional surface equipment (e.g. meters, valves and pipes) not required for SAGD itself. In a typical three-month start-up procedure, approximately 13,500 meters cubed ($m^3$) of cold water equivalent (CWE) steam (approximately 85,000 oil barrel CWE steam) may be needed for each wellbore in a SAGD injection-production well pair.

When the wellbores are initially completed in the subterranean reservoir, they may be separated from each other by a heavy-oil containing region 125 of the subterranean reservoir. Fluid communication may be established through the heavy-oil containing region 125 for a fully-effective SAGD process to be operated. As steam may not be immediately available, it may be possible to use heavy oil diluents to establish fluid communication between a first point in the reservoir, e.g., injection wellbore 106, and a second point, e.g., production wellbore 108. The first point and the second point may be beyond the intervening heavy-oil containing region 125. The use of diluents may lead to problems. Diluents may cause asphaltenes to precipitate within the heavy-oil containing region 125 at locations between the wellbores. The asphaltenes may significantly reduce the porosity of the subterranean reservoir. The asphaltenes may possibly adversely affect the rate of production of a subsequent SAGD process. Diluents may be required in large volumes to achieve fluid communication and, if subjected to high injection pressures, may disperse widely in the subterranean reservoir rather than being concentrated in the heavy-oil containing region 125 between the wellbores. If a diluent is used to establish fluid communication in a water-wet reservoir, it must be able to operate in water-wet reservoirs, even though the presence of the water establishes an oil/water interface having high surface tension that may prevent good mixing of a diluent with the heavy oil within the reservoir.

Methods of the present disclosure may include a method of establishing fluid communication between the first point and the second point within the subterranean reservoir, separated by the heavy-oil containing region that enables heavy-oil production by a steam-based heavy-oil process, may include injecting a first penetrating liquid into the subterranean reservoir at the first point and establishing fluid communication through the heavy-oil containing region by allowing the first penetrating liquid to penetrate into and completely through the heavy-oil containing region between the first point and the second point.

Methods of the present disclosure may occur during the start-up phase. Methods of the present disclosure may occur before the steam-based heavy oil process commences. Methods of the present disclosure may occur before a solvent-based production process commences.

The first penetrating liquid may dilute the heavy oil. The first penetrating liquid may be water-free. The first penetrating liquid may be the liquid injected into the injection wellbore to help establish fluid communication. The first penetrating liquid may dilute the heavy oil without causing deposition of asphaltenes. The first penetrating liquid may comprise a first penetrating liquid polar compound. The first penetrating liquid polar compound may be at least partially miscible with water.

The first penetrating liquid polar compound may be configured to act as at least one of an injectivity-enhancing agent and a viscosity-reducing agent. The first penetrating liquid polar compound may be able to penetrate between the heavy oil and water phases along the interface between heavy oil and the water phases. The first penetrating liquid polar compound may be able to flow quickly along the interface while mixing with, diluting and/or dissolving a relatively small amount of heavy oil from a heavy oil surface.

The first penetrating liquid polar compound may have good "leak-off characteristics." Good "leak-off characteristics" may mean that the first penetrating liquid polar compound may move quickly through the heavy-oil containing region because of the first penetrating liquid polar compound's ability to flow along the heavy oil/water interface.

The first penetrating liquid polar compound may penetrate the heavy oil faster than prior art solvents by finding its way through polar components in heavy oil. The polar compound may penetrate faster through the heavy-oil containing region, thereby enhancing the rate of injection of the first penetrating liquid polar compound compared to non-polar diluents used alone and injected in the same manner as the first penetrating liquid polar compound. The penetration may be done without mobilizing amounts of the heavy oil that could prematurely increase the viscosity of the first penetrating liquid polar compound/heavy oil mixture as penetration of the first penetrating liquid polar compound through the heavy-oil containing region proceeds. The viscosity of the heavy oil that is mixed with and/or dissolved in the first penetrating liquid polar compound may be reduced so that the heavy oil may flow freely with the first penetrating liquid polar compound and penetrate through the heavy-oil containing region. When fluid communication has been established through the heavy-oil containing region between the first and second points in the subterranean reservoir (i.e. wellbores 106 and 108), the first penetrating liquid polar-compound/heavy-oil mixture may possibly be produced from the subterranean reservoir.

The first penetrating liquid polar compound may have a Hansen polarity value of 4 or more. The first penetrating liquid polar compound may have Hansen hydrogen bonding parameters of 3 or more. Mixtures of two or more first penetrating liquid polar compounds may be employed in the first penetrating liquid. The mixture of the first penetrating liquid polar compounds may be such that the mixture itself has the Hansen polarity value indicated above.

Examples of a suitable first penetrating liquid polar compound includes, but is not limited to, propyl acetate ester, acetone, dimethyl ether, and mixtures of any two or more of propyl acetate ester, acetone, and dimethyl ether. Acetone may penetrate a heavy-oil containing region more quickly than some other penetrating liquid polar compounds and may dissolve only a small fraction of the heavy oil. The acetone may possibly dissolve just the resin component of the heavy oil that amounts to about 5 to 10% by weight of the total amount of heavy oil. For example, the acetone may possibly dissolve just the resin component of the heavy oil that amounts to about 7% by weight. The percentage by weight of the total amount of heavy oil discussed above may be within a range that includes or is bounded by the preceding example. The penetration of the acetone may be due to the polarity of the first penetrating liquid polar compound and/or its hydrogen bonding ability.

While fluid communication may be established using the first penetrating liquid polar compound, there may not be much of increase in the free space within the heavy-oil containing region. The first penetrating liquid polar compound may not mobilize much of the heavy oil.

In addition to the first penetrating liquid polar compound, the first penetrating liquid may comprise a first penetrating liquid non-polar solvent. The first penetrating liquid non-polar solvent may have a higher solubility in heavy oil than the first penetrating liquid polar compound. The first penetrating liquid non-polar solvent may have a slower rate of penetration than the first penetrating liquid polar compound. The first penetrating liquid non-polar solvent may follow the routes of fluid communication established by the first penetrating liquid polar compound while dissolving more heavy oil (i.e., additional heavy oil not dissolved by the first penetrating liquid polar compound) from the heavy oil surface. The first penetrating liquid non-polar solvent may increase the free pore space of the heavy-oil containing region. The first penetrating liquid non-polar solvent may increase the volume of fluid, such as steam, that may flow through the heavy-oil containing region in subsequent recovery processes. The first penetrating liquid non-polar solvent may enhance and stabilize the fluid communication established by the first penetrating liquid polar compound. The first penetrating liquid non-polar solvent may be fully miscible with the heavy oil.

Examples of a suitable first penetrating liquid non-polar solvent include but are not limited to aromatic hydrocarbons, e.g., xylene, and/or toluene. Other examples of first penetrating liquid non-polar solvents include, but are limited to, saturated aliphatic hydrocarbons, e.g., alkanes having at least three carbon atoms, including natural gas condensates.

The first penetrating liquid non-polar solvent may have a HSP value P of 1.5 or less. The first penetrating liquid non-polar solvent may be mixed to form a mixture having a HSP value P of 1.5 or less. Any of the aforementioned ranges may be within a range that includes or is bounded by any of the preceding examples. While the HSP value P may be critical for the first penetrating liquid non-polar solvent, the HSP value D and/or HSP value H could also be critical or critical instead of the HSP value P.

While the first penetrating liquid non-polar solvent may be configured to penetrate a heavy-oil containing region by itself, it may take longer to do so than it does if the first penetrating the polar compound. The time required for penetration of the first penetrating liquid non-polar solvent may be reduced if the first penetrating liquid non-polar solvent is used in conjunction with the first penetrating liquid polar compound.

When employing a first penetrating liquid non-polar solvent in conjunction with the first penetrating liquid polar compound, the volume of heavy oil mobilized during start-up may be no more than 10% of the total heavy oil present. Consequently, SAGD or another steam-based heavy oil recovery process may be used after employing the first penetrating liquid polar compound, the first penetrating liquid non-polar-solvent or the first penetrating liquid polar compound and the first penetrating liquid non-polar solvent.

The polar compound, which may also be referred to throughout the present disclosure as the first penetrating liquid polar compound and/or a second penetrating liquid polar compound, and the non-polar solvent, which may also be referred to throughout the present disclosure as the first penetrating liquid non-polar solvent and/or a second penetrating liquid non-polar solvent, may be employed separately and/or sequentially. When employed separately and/or sequentially, the first penetrating liquid comprising the first penetrating liquid polar compound may be employed and a second penetrating liquid comprising a second-penetrating liquid non-polar solvent may be employed. The first penetrating liquid may be employed before or after the second penetrating liquid when the polar compound and the non-polar solvent are employed separately and/or sequentially. When employed separately and/or sequentially, the first penetrating liquid and the second penetrating liquid may form a combined penetrating liquid. When not employed separately and/or sequentially, the first penetrating liquid polar compound and the first penetrating liquid non-polar solvent may be mixed together to form the first penetrating liquid. Regardless of whether employed separately and/or sequentially or not, the polar compound and the non-polar solvent may be mixed together.

If a mixture of polar compound and non-polar solvent are employed, any ratio of the polar compound to the non-polar solvent may be employed. For example, 90-10% by volume of polar compound to the total of the mixture may be employed. As another example, 20-80% by volume of polar compound to the total may be employed. Any of the aforementioned ranges may be within a range that includes or is bounded by any of the preceding examples.

The ratio of the polar compound to the non-polar solvent may vary over time. For example, a high ratio of polar compound to non-polar solvent may be initially employed. The high ration of polar compound to non-polar solvent may be more than 50% by volume of the total mixture. A higher amount of polar compound than non-polar solvent may be employed initially to establish fluid communication rapidly and then a higher amount of non-polar solvent than polar compound may be employed to exploit and enlarge the fluid communication pathways created by the polar compound. The ratio of the polar compound to the non-polar solvent may be "tapered", i.e. reduced from the initial ratio of polar compound to non-polar compound.

The methods of the present disclosure may comprise injecting an interfacial-tension reducing agent into the injection wellbore. The interfacial-tension reducing agent may be referred to as the first penetrating liquid interfacial-tension reducing agent and/or the second penetrating liquid interfacial-tension reducing agent.

The interfacial-tension reducing agent may be a surfactant or mixture of surfactants. The interfacial-tension reducing agent may reduce a surface tension at the interface of the heavy oil and water within the heavy-oil containing region. The interfacial-tension reducing agent may facilitate the penetration of the polar compound and/or the non-polar solvent between the heavy oil and water at the interface of the heavy oil and the water.

Suitable interfacial-tension reducing agents may have HSP within the following ranges: D=15-16; P=4-7; and H=9-11. Any of the aforementioned ranges may be within a range that includes or is bounded by any of the preceding examples.

Examples of suitable interfacial-tension reducing agents include, but are not limited to, biodiesel and methyl ester ethoxylate.

The interfacial-tension reducing agent may be part of the first penetrating liquid and/or the second penetrating liquid. In other words, the first penetrating liquid may comprise the polar compound and the interfacial-tension reducing agent and/or the second penetrating liquid may comprise the non-polar solvent and the interfacial-tension reducing agent. If the first penetrating liquid comprises the polar compound and the non-polar solvent, the first penetrating liquid may further comprise the interfacial-tension reducing agent. Any effective ratio of interfacial-tension reducing agent to polar compound and/or non-polar solvent may be employed.

To establish fluid communication through a heavy-oil containing region more quickly than the conventional period of several months, the first penetrating liquid may comprise a single polar compound or a mixture of polar compounds. The first penetrating liquid may also comprise the interfacial-tension reducing agent. The first penetrating liquid may not comprise a non-polar solvent. While fluid communication may be established more quickly than the usual conventional period of several months, the amount of heavy oil recovered in the start-up operation may be smaller than the amount of heavy oil recovered when a non-polar solvent is contained within the first penetrating liquid. The smaller amount of heavy oil recovered may enable penetration of the heavy-oil containing region by a fluid, such as steam, employed for the production of heavy oil. To achieve a greater potential for subsequent fluid flow and/or greater stability of the fluid communication, the first penetrating liquid may further comprise a single non-polar solvent or a mixture of non-polar solvents. Including the single non-polar solvent or mixture of non-polar solvents may be feasible when there is not a need to establish fluid communication through the heavy-oil containing region very quickly. In other words, additionally including the single non-polar solvent or mixture of non-polar solvents may be feasible when there is more time for start-up.

The polar compound, non-polar solvent and/or interfacial-tension reducing agent may be employed in liquid form. The polar compound, non-polar solvent and/or interfacial-tension reducing agent may be employed at ambient (e.g., surface) temperature.

The polar compound, non-polar solvent and/or interfacial-tension reducing agent may be heated prior to being injected into the subterranean reservoir. The polar compound, non-polar solvent and/or interfacial-tension reducing agent may be heated to injection temperatures that are higher than the ambient temperature at the surface. The polar compound, non-polar solvent and/or interfacial-tension reducing agent may be heated to any temperature below their respective boiling points at an operational pressure at which the polar compound, non-polar solvent and/or interfacial-tension reducing agent may be injected into the subterranean reservoir. Alternatively, polar compound, non-polar solvent and/or interfacial-tension reducing agent may not be heated prior to being injected into the subterranean reservoir The polar compound, non-polar solvent and/or interfacial-tension reducing agent may not be heated when the polar compound, non-polar solvent and/or interfacial-tension reducing agent are within the subterranean reservoir. Examples of heating within the subterranean reservoir could include, but are not limited to, using radio frequency coupling or adding a condensing fluid such as steam to the subterranean reservoir. Not having to heat the polar compound, non-polar solvent and/or interfacial-tension reducing agent within the reservoir is advantageous because heat conveying fluids, such as steam, may not be available for many months and/or other methods of subterranean heating may be expensive and/or difficult to implement. The polar compound, non-polar solvent and/or interfacial-tension reducing agent may be able to establish fluid communication without relying on further heat added to a subterranean reservoir other than by the polar compound, non-polar solvent and/or interfacial-tension reducing agent themselves due to their injection temperatures. Alternatively, the polar compound, non-polar solvent and/or interfacial-tension reducing agent may be heated when the polar compound, non-polar solvent and/or interfacial-tension reducing agent are within the subterranean reservoir.

The methods of the present disclosure may comprise injecting the first penetrating liquid at a first injection pressure and at a first injection temperature into the subterranean reservoir at the first point. The method of establishing fluid communication may comprise injecting the second penetrating liquid at a second injection pressure and at a second injection temperature into the subterranean formation at the first point. The methods of the present disclosure may comprise penetrating the second penetrating liquid through said heavy-oil containing region to said second point. The first injection pressure and/or the second injection pressure may be referred to separately and/or collectively as an injection pressure. The first injection temperature and/or the second injection temperature may be referred to separately and/or collectively as an injection temperature.

The first and/or second penetrating liquids may be injected into the subterranean reservoir at an injection pressure higher than a native pressure of the subterranean reservoir. The injection pressure may be higher than the native pressure to provide an impetus to penetration of the liquid into the heavy oil-containing region and some dilation. The injection pressure of the first penetrating liquid and/or the second penetrating liquid may be relatively low even though the injection pressure of the first penetrating liquid and/or the second penetrating liquid may be higher than the native pressure of the subterranean reservoir. For example, the injection pressure may be equal to a pressure at the head of liquid within the injection and/or production wellbores 106, 108. In other words, the first penetrating liquid and/or the second penetrating liquid may be introduced into the injection wellbore and/or the production wellbore at atmospheric pressure until the injection wellbore and/or the production wellbore is filled to a predetermined height (as determined, for example, by a "fluid shot" involving injection of a small volume of nitrogen under pressure from a cylinder and listening for the echo), and then left to penetrate or soak into the heavy-oil containing region under the effects of gravity.

As penetration of the first penetrating liquid and/or the second penetrating liquid proceeds, and if there are no further additions of first penetrating liquid and/or the second penetrating liquid to the wellbore, a pressure differential between the injection pressure of the first penetrating liquid and/or the second penetrating liquid and the pressure of the reservoir may fall to zero. The pressure differential falling to zero may allow the first penetrating liquid and/or the second penetrating liquid to remain in the region of the production wellbore and/or the injection wellbore without being forced under high pressure to follow a path of least resistance that may lead the first penetrating liquid and/or the second penetrating liquid away from the heavy-oil containing region into regions surrounding the subterranean reservoir. The relatively low (and possibly reducing) operational pressure and/or the effect of maintaining the first penetrating liquid and/or the second penetrating liquid in the heavy-oil containing region of the injection wellbore and/or the production wellbore may have the effect of allowing multiple fluid pathways to be formed through the heavy-oil containing region. The provision of multiple fluid pathways is desirable for better and more stable fluid communication.

It may be advantageous to allow the first penetrating liquid and/or the second penetrating liquid to penetrate slowly by maintaining an injection pressure not far above that of the subterranean reservoir. Maintaining the injection pressure not far above that of the subterranean reservoir, may allow multiple "fingers" of the first penetration liquid and/or the second penetration liquid to extend into the heavy-oil containing region from the horizontal length of the production wellbore and/or the injection wellbore, thereby improving overall fluid communication. Fingers may refer to fluid pathways.

If there are or more fluid pathways, for the fluid pathway(s) may be formed at the extreme end (or "toe") of a wellbore (i.e., the production wellbore or the injection wellbore) used for injection of the first penetrating liquid and/or the second penetrating liquid. If the fluid pathway(s) are formed at the extreme end of the wellbore, then during subsequent fluid in a steam-based heavy oil recovery process may flow along the length of the injection wellbore. The flow may provide a good area for conduction of heat into the subterranean reservoir. The flow may provide a good area for conduction of heat through the heavy-oil containing region between the wellbores. The flow may provide a good area for conduction of heat along the length of the production wellbore. One way of arranging the good area for conduction of heat is to drill the injection and production wellbores in such a way that the respective toes are closer together than other parts of the injection and production wellbores. Drilling the respective toes closer together may ensure that the thickness of the heavy-oil containing region between the injection and production wellbores is smaller at the toes. The thickness of the heavy-oil containing region being smaller at the toes may enable complete penetration of the first penetrating liquid and/or the second penetrating liquid to first occur at the toe and then to be terminated.

As the first penetrating liquid and/or the second penetrating liquid penetrate into the heavy-oil containing region, a level of the first penetrating liquid and/or the second penetrating liquid within the injection wellbore and/or the production wellbore may decrease and eventually reach the lowest point of injection into the heavy-oil containing region. In such a case, the injection pressure of the first penetrating liquid and/or the second penetrating liquid may decline over time. The decline may be acceptable because the declining operational pressure may have the effect of maintaining the first penetrating liquid and/or the second penetrating liquid in the heavy-oil containing region of the wellbore used for the fluid injection. The decline may be acceptable because it may have the effect of allowing multiple fluid pathways to be formed through the heavy-oil containing region.

To prevent the level of the first penetrating liquid and/or the second penetrating liquid from decreasing, additional first penetrating liquid and/or the second penetrating liquid may be injected. Additional first penetrating liquid and/or second penetrating liquid refers to adding more first penetrating liquid and/or second penetrating liquid than was originally added. Adding the additional first penetrating liquid and/or second penetrating liquid may keep the first injection pressure and/or the second injection pressure above a minimum first injection pressure and/or a minimum second injection pressure, respectively. Adding the additional first penetrating liquid and/or second penetrating liquid may provide time for fluid communication to be established through the heavy-oil containing region.

If the first penetrating liquid comprises a polar compound and the second penetrating liquid comprises a non-polar solvent, the polar compound and the non-polar solvent may be separately injected into the injection wellbore. For example, the first penetrating liquid may be injected first and the second penetrating liquid may be injected second. The separate injection could entail, for example, first filling the injection wellbore to a predetermined level with the first penetrating liquid, allowing the height of a surface of the first penetrating liquid within the injection wellbore to fall, adding more of the first penetrating liquid, if required, again allowing the surface height to fall, then introducing the second penetrating liquid into the injection wellbore and/or making further additions of the second penetrating liquid.

The surface of the penetrating liquid is defined as the top most portion of the penetrating liquid within the wellbore after the penetrating liquid is injected into the wellbore. In other words, the surface of the penetrating liquid is defined as the portion of the penetrating liquid closest to the surface of the formation. The surface of the penetrating liquid may also be referred to as the head of the penetrating liquid. The head of the penetrating liquid helps determine a pressure of the penetrating liquid at the point at which the penetrating liquid is injected.

To change the ratio of polar compound to non-polar solvent over time when a penetrating liquid contains a polar compound and a non-polar solvent may be achieved by first adding penetrating liquid containing a mixture having a ratio suitable for a start of the fluid-communication establishing method, e.g., a high ratio of polar compound to non-polar solvent, allowing the liquid level in the wellbore to fall, and then adding a further amount of a penetrating liquid having a different ratio of polar compound to non-polar solvent, e.g., a ratio with a higher proportion of non-polar solvent. This may be repeated as many times as required, each time changing the ratio of solvents, or maintaining a fixed desired ratio after one or two changes.

As is the case with steam injected into the subterranean reservoir during a steam-based heavy oil recovery process, the first penetrating liquid and/or the second penetrating liquid may be injected into the injection wellbore 106 and/or the production wellbore 108.

When both the injection wellbore and the production wellbore are employed for the injection of the first penetrating liquid and/or the second penetrating liquid, the penetrating liquid, where the first penetrating liquid or the second penetrating liquid may be referred to as the penetrating liquid, injected into the injection wellbore may be different from or the same as the penetrating liquid injected into the production wellbore. Reasons to inject different penetrating liquids include (a) different densities or viscosities of heavy oil surrounding the injection wellbore versus that of the production wellbore, and/or (b) different water contents in the heavy-oil containing region surrounding the injection wellbore versus that of the production wellbore. Penetrating liquids tailored to be effective in environment (a) and/or (b) may be employed.

When both the injection wellbore and the production wellbore are employed for the injection of the first penetrating liquid and/or the second penetrating liquid, the surface levels of the penetrating liquids introduced into the injection wellbore and the production wellbore may be made such that the levels of the penetrating liquids above their respective points of injection are the same or different. If made the same, penetration of the heavy-oil containing region between the injection wellbore and the production wellbore may proceed equally from each of the injection wellbore and the production wellbore. If made the same, penetration of the heavy-oil containing region between the injection wellbore and the production wellbore may produce a pressure wave midway between the injection wellbore and the production wellbore. There may be no clear indication of when fluid communication has been established between the injection wellbore and the production wellbore because there may be no change of level in the injection wellbore and the production wellbore when fluid communication occurs. If the surface of the penetrating liquid in the injection wellbore and the production wellbore are different, penetration of the liquids from the injection wellbore and the production wellbore into the heavy-oil containing region may proceed at different rates. If the surface of the penetrating liquid in the injection wellbore and the production wellbore are different, establishment of fluid communication may be signaled by an equalization of the surface of the penetrating liquids in the two wellbores, respectively. The establishment of fluid communication signaled by equalization may be determined by fluid shots, as previously discussed in this disclosure. If the surface of the respective penetrating liquids differ in a way that varies over time, e.g., if one of the injection wellbore and the production wellbore is provided with supplementary amounts of the penetrating liquid(s) at different times from the other of the injection wellbore and the production wellbore, the pressures of the penetrating liquids injected by the injection wellbore and the production wellbore may differ over time. The difference over time may produce a pressure wave that moves back and forth between the injection wellbore and the production wellbore over time. The pressure wave may be beneficial for achieving fluid communication as the penetrating liquids may be caused to reverse their direction of flow between the injection wellbore and the production wellbore from time to time.

As is the case with the steam injected into the subterranean reservoir during the steam-based heavy oil recovery process, the first penetrating liquid and/or the second penetrating liquid may be separated from the heavy oil after being produced. As is case with the steam injected into the subterranean reservoir during the steam-based heavy oil recovery process, the first penetrating liquid and/or the second penetrating liquid may be re-injected into the injection wellbore and/or the production wellbore. All or only a portion of the first penetrating liquid and/or the second penetrating liquid may be re-injected. Re-injection of the first penetrating liquid and/or the second penetrating liquid may increase the effectiveness of the penetrating liquid while waiting for steam to become available.

The establishment of fluid communication between the injection wellbore and the production wellbore may be apparent from a relatively rapid decline of fluid level within the wellbore used for the injection of the penetrating liquid as the liquid drains into the wellbore used for production. The rate of the decline may indicate the strength of the fluid communication achieved.

The first penetrating liquid and/or the second penetrating liquid may be injected into the heavy-oil containing region using any suitable type of pressure. For example, gravity may be used to inject the first penetrating liquid and/or the second penetrating liquid into the heavy-oil containing region. In addition to or instead of gravity, another type of pressure may be applied. A pressure pump may feed the first penetrating liquid and/or the second penetrating liquid into the injection wellbore and/or the production wellbore. A non-condensing gas under pressure could be injected into the injection wellbore and/or the production wellbore above the first penetrating liquid and/or the second penetrating liquid in the injection wellbore and/or the production wellbore.

As a result of being injected using any suitable type of pressure, the first penetrating liquid and/or the second penetrating liquid may have an enhanced pressure. The enhanced pressure of the first penetrating liquid and/or second penetrating liquid in the injection wellbore and/or the production wellbore may be made the same or different. The enhanced pressure of the first penetrating liquid and/or second penetrating liquid in the injection wellbore and/or the production wellbore may be made constant over time or variable over time. The enhanced pressure of the first penetrating liquid and/or the second penetrating liquid may be pulsed, i.e. increased and decreased quickly over time, to improve liquid penetration.

The first penetrating liquid and/or the second penetrating liquid may comprise a volatile compound that exists in liquid form at the injection pressure of the first penetrating liquid and/or the second penetrating liquid, but in vapor form at a pressure lower than the injection pressure. The first penetrating liquid and/or the second penetrating liquid may be injected into the heavy-oil containing region in liquid form for a certain period of time to allow partial penetration. Then the pressure of the first penetrating liquid and/or second penetrating liquid may be reduced below the lower pressure to cause the volatile compound to vaporize within the heavy-oil containing region. As an example, if a subterranean reservoir is at a native pressure of 3 MPa and a temperature of 13° C., and the pressure is then lowered by producing from injection wellbore and/or the production wellbore, the volatile compound may change to vapor and help to displace heavy oil and/or liquid from the subterranean reservoir. The amount of the volatile compound present in the first penetrating liquid and/or second penetrating liquid may be quite small (e.g., less than 10% by volume) while still being very effective.

The resulting large increase in volume of the volatile compound may drive heavy oil and/or components of the first penetrating liquid and/or second penetrating liquid through the heavy-oil containing region to accelerate the establishment of fluid communication and/or to deliver producible fluids to the injection wellbore and/or the production wellbore. The reduction in pressure may be produced by venting the non-condensable gas from injection wellbore and/or the production wellbore, or by injection of a downhole pump in one of the wellbores to lower the pressure in the injection wellbore and/or the production wellbore and an adjacent subterranean reservoir, and to produce any liquid therein.

The volatile compound may be any suitable compound. For example, the volatile compound may be dimethyl ether or methane condensate.

The methods of the present disclosure may comprise injecting a compressible non-condensing gas into the injection wellbore and/or the production wellbore. The injection of the compressible non-condensing gas may have the effect of displacing excess water from the subterranean reservoir if the subterranean reservoir includes water. The displacing of excess water may leave more pore space for the injection of the first penetrating liquid and/or the second penetrating liquid to establish fluid communication between the injection wellbore and the production wellbore. The displacing of excess water may be done before the first penetrating liquid and/or second penetrating liquid are injected into the injection wellbore and/or the production wellbore. The displacing of the excess water may be done after at least some of the first penetrating liquid and/or second penetrating liquid have penetrated into the heavy-oil containing region.

The first penetrating liquid and/or the second penetrating liquid may be injected into the subterranean reservoir in admixture with drilling muds while the injection wellbore and the production wellbore are being completed. Injecting the first penetrating liquid and/or the second penetrating liquid in admixture with drilling muds may allow penetration of the first penetrating liquid and/or the second penetrating liquid into the heavy-oil containing region to commence as soon as possible. Further injections of the first penetrating liquid and/or the second penetrating liquid may occur after drilling the injection wellbore and/or the production wellbore.

Once fluid communication has been established in the manner disclosed herein, a steam-based heavy oil recovery process, such as SAGD, may be commenced. Care may be appropriate when transitioning from a start-up phase to the steam-based heavy oil recovery process. It may be desirable to employ an intermediate phase between the start-up phase and the steam-based heavy oil recovery process. For example, an intermediate phase may comprise the injection of warm or hot water at low rates of injection to confirm that fluid communication exists. After confirming fluid communication exists, the injection of warm or hot water may be progressively increased to slowly heat and grow the fluid communication path(s) in the subterranean reservoir. Slowly introducing heat may take from one to five days or more. Slowly introducing heat has an advantage of ensuring that large volumes of heavy oil heated near the point of injection do not flow rapidly into a cooler reservoir near the point of production and plug the communication pathways. The steam-based heavy oil recovery process involving the injection of steam may follow the intermediate phase.

The establishment of fluid communication or a failure to establish adequate fluid communication, for a subsequent steam-based heavy oil recovery process may become apparent as the steam-based heavy oil recovery process commences. If the production of heavy oil increases with time, and if the temperature of the produced fluid increases as the steam-based heavy oil recovery process proceeds, the degree of fluid communication may be regarded as adequate and the operation of the steam-based heavy oil recovery process may increase the degree of fluid communication. If the temperature of the produced fluid decreases, or if the rate of produced fluid decreases, the degree of fluid communication may be insufficient. An insufficient amount of fluid communication may be remedied by injecting more penetrating liquid or by injecting more steam. The injection of more penetrating liquid may occur during the steam-based heavy oil recovery process. The injection of more steam occurs during the steam-based heavy oil recovery process.

Figure 2:
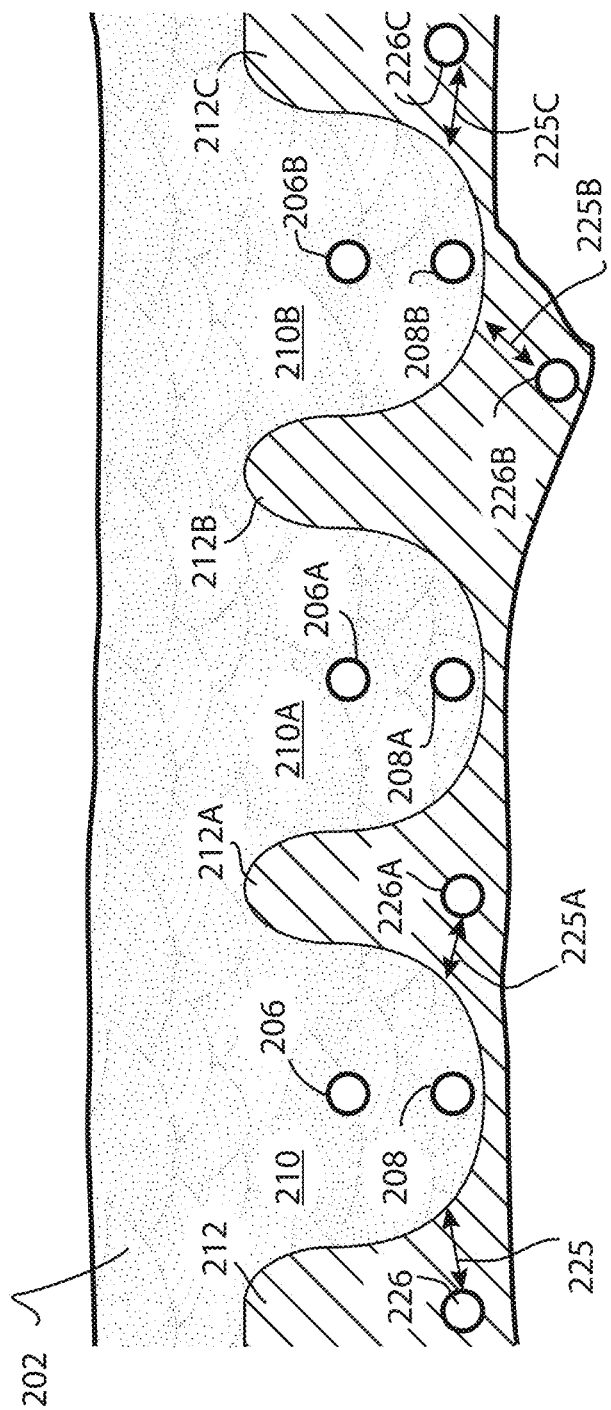
FIG. 2 is a cross-section of a subterranean reservoir.

In the above description, reference has been made to establishing fluid communication between newly-drilled SAGD wellbores, but fluid communication may be established in similar ways through heavy-oil containing regions encountered in other steam-based heavy oil recovery process which includes other SAGD operations. For example, in oilfields that have been previously produced by SAGD or other processes that leave a heavy-oil depleted zone within the subterranean reservoir, unproduced heavy oil may remain in certain parts of the subterranean reservoir, e.g., between steam chambers produced by SAGD. It may be economically advantageous to produce heavy oil from such previously-unproduced parts of a reservoir. For example, FIG. 2 is a schematic view of a vertical cross section of a heavy-oil containing reservoir 202 that has been previously produced by SAGD via wellbore pairs 206/208, 206A/208A and 206B/208B leaving porous heavy-oil depleted zones 210, 210A and 210B in the form of steam chambers that merge together towards the top of the reservoir 202. Between these zones, and at the far sides of the outer zones, heavy-oil containing regions 212, 212A, 212B, and 212C remain unproduced because the steam from injection wellbores 206, 206A and 206B did not reach these regions during the SAGD process. It may be possible to produce these regions further by SAGD by drilling infill wellbores 226, 226A, 226B and 226C as new production wellbores into the unproduced regions, providing the infill wellbores with downhole pumps, and then injecting steam into wellbores 206, 206A or 206B used for the previous steam injection, or wellbores 208, 208A, 208B used previously as production wellbores, or both. The infill wellbores 226, 226A, 226B, 226C may be positioned at about the same height in the subterranean reservoir as the previous production wellbores 208, 208A, 208B, or lower, for example if the bottom of the subterranean reservoir dips below average at one or more points, e.g., as shown for infill wellbore 226B. Before commencing SAGD process using the infill wells as production wellbores, fluid communication may be established by introducing the penetrating liquids previously described into the infill wellbores so that the liquids may penetrate the heavy-oil containing regions 225, 225A, 225B, 225C, etc., between the infill wellbores and the heavy-oil depleted zones 210, 210A, 210B. The penetrating liquid(s) may be introduced at a pressure higher than that in the heavy-oil depleted zones 210, 210A, 210B. Complete penetration, resulting in fluid communication, may be apparent when the pressure of the liquids in the infill wellbores falls due to loss of pressure to the lower-pressure heavy-oil depleted zones 210, 210A, 210B.

When extracting heavy oil from unproduced heavy-oil containing regions of previously-produced oilfields, the temperature of the unproduced heavy-oil containing regions may be higher than the initial ambient temperature of the subterranean reservoir due to prior exposure of the formation to steam or other heat-producing fluids. The initial ambient temperature may be, for example, a temperature in the range of 6 to 15° C., for, for example, oil sands in Canada. For example, the initial ambient temperature could be 8° C. For example, the temperature of the unproduced heavy-oil containing regions may be up to 20° C., the temperature of the unproduced heavy-oil containing regions may be up to 50° C., or the temperature of the unproduced heavy-oil containing regions may be up to 150° C. Any of the aforementioned ranges may be within a range that includes or is bounded by any of the preceding examples. The temperature of the unproduced heavy-oil containing regions may make the heavy oil in the unproduced heavy-oil containing regions easier to mobilize. Lower temperatures of the unproduced-heavy oil containing regions may also be used.

Methods of the present disclosure may comprise injecting a single penetrating liquid containing the polar compound or a mixture of polar compounds. The mixture of polar compounds may not comprise the non-polar solvent. The mixture of polar compounds may comprise an interfacial-tension reducing agent.

The methods of the present disclosure may include a method of assessing a subterranean reservoir for suitability for heavy oil production by a solvent-based heavy oil production process. The solvent-based production process may be employed as an alternative to a steam-based heavy oil recovery process. Examples of solvent-based production processes include, but are not limited to, the use of solvent alone, the use of heated liquid solvent or vapor, cyclic liquid or vaporized solvent injection processes, continuous liquid or vaporized solvent injection, heated VAPEX processes (vapor extraction by injection of vaporized hydrocarbon solvents into heavy oil reservoirs), directly or indirectly heated solvent systems, an N-Solv™ method (which uses warm solvent to extract bitumen from oil sands), etc. A steam-based heavy oil recovery process may be commenced after a solvent-based production process.

In assessing the suitability for heavy oil production by a solvent-based production process, a penetrating liquid may be used in the manner indicated above to quickly demonstrate that fluid communication may be achieved through a heavy-oil containing region of a subterranean reservoir. That is to say, the penetrating liquid may be injected at an injection pressure and an injection temperature into the subterranean reservoir via wellbores. The penetrating liquid may comprise a polar compound and/or a non-polar solvent. The polar compound may be the polar compound described above. The non-polar solvent may be the non-polar solvent described above. The penetrating liquid may comprise a plurality of penetrating liquids, such as the first penetrating liquid and/or the second penetrating liquid described above.

The penetrating liquid may be allowed to remain in contact with the heavy-oil containing region for a predetermined time. The predetermined time may be a time that would be suitable to allow penetration by the penetrating liquid for a subterranean reservoir suitable for a solvent-based production process. Such a time might be, for example, 1 to 3 months. During the time, the wellbores used for injection of the penetrating fluid may be kept under observation to determine an occurrence of penetration of the penetrating liquid through the heavy oil containing region. The occurrence may comprise evidence of successful fluid communication. The evidence may include, but is not limited to, a fall in level of the liquid in at least one of the wellbores that is quicker than previously observed and/or the appearance of producible fluid in an unused wellbore. The subterranean reservoir may be declared suitable or unsuitable for production by the solvent-based production process depending on the evidence emerging within the predetermined time.

Tests have been carried out to compare the efficiency of various penetrating liquids. For this purpose, penetrating liquid penetration, penetrating liquid extraction time and average rate of heavy oil, in this case bitumen, production were measured and the results are shown in Table 1 below.

Figure 3:
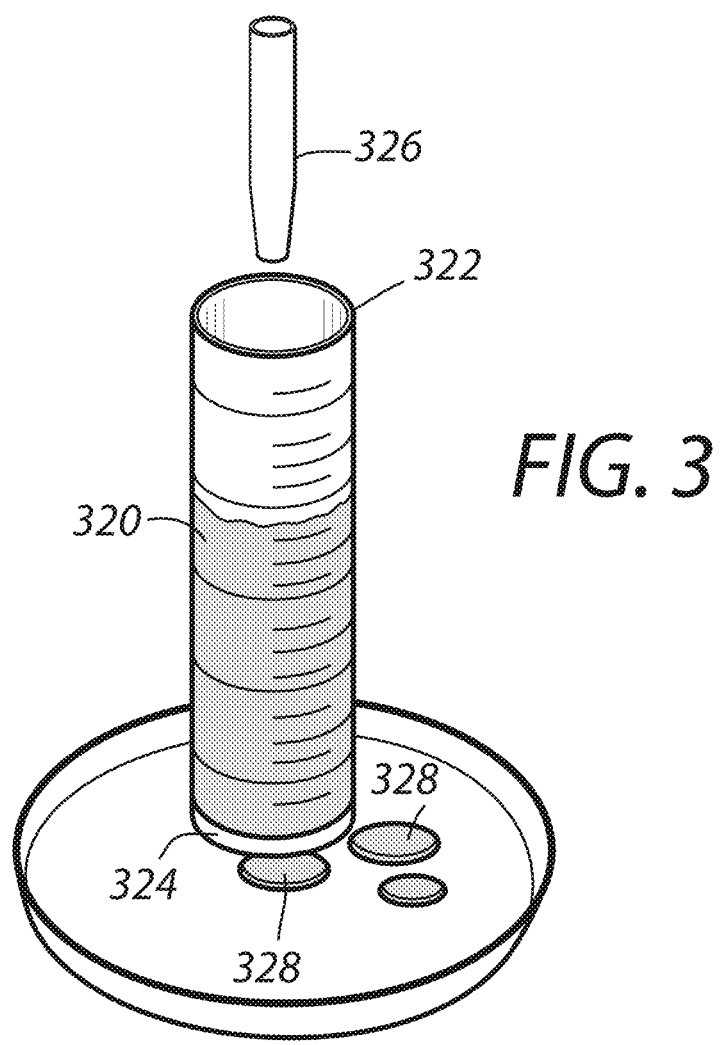
FIG. 3 is a schematic of a test apparatus.

As represented in FIG. 3, for each test, 24.83 gram (g) of high-grade Athabasca oil sands material 320 was packed into a 5 milliliter (mL) graduated cylinder 322 to a height of 4.5 centimeter (cm) and a volume of 15 mL. The bottom part of the cylinder was cut off and replaced with a welded screen 324 to allow liquid to flow through the screen while catching sand particles. An amount of test penetrating liquid (28 mL) was poured on top of the oil sands from a feed tube 326 and allowed to flow under gravity through the oil sands material at atmospheric pressure and room temperature. The penetrating liquid penetrated the oil sands in a downward direction and the diluted bitumen 328 dripping out from the screen was collected. The time before emergence of the first drop of bitumen is reported in Table 1 as the breakthrough time (BT). After that, the test was continued until all of the penetrating liquid penetrated the oil sands matrix and the last drop of diluted bitumen was collected. The time from first contact of the penetrating liquid with the oil sands material to the collection of the last drop is reported in the table as the extraction time (ET).

The tests were carried out on the following penetrating liquid and mixtures of penetrating liquid: xylene (Xyl) as a comparative example, acetone (Ace) and xylene sequentially, acetone and xylene simultaneously, acetone and mixture of acetone and xylene sequentially, acetone and heptane (C7) simultaneously, acetone and mixture of acetone and a commercial hydrocarbon solvent procured from Provident Diluent (Prod. Dil.) sequentially, and acetone alone.

From these tests, it was determined that adding a penetrating liquid comprising a polar compound, such as acetone, may reduce the breakthrough time and the extraction time.

TABLE 1

| SOLVENT | BT* min. | ET** min. | Bitumen Recovered*** g bitumen/100 g OS | Average Bitumen Rate*** Bitumen/100 g OS/min. |
|---|---|---|---|---|
| Xyl | 225 | 590 | 12.01 | 0.02 |
| Ace followed by Xyl | 104 | 644 | 12.77 | 0.02 |

TABLE 1-continued

| SOLVENT | BT* min. | ET** min. | Bitumen Recovered*** g bitumen/100 g OS | Average Bitumen Rate*** Bitumen/100 g OS/min. |
|---|---|---|---|---|
| Ace + Xyl | 68 | 345 | 9.58 | 0.03 |
| Ace followed by (Ace + Xyl) | 18 | 306 | 10.55 | 0.03 |
| Ace + C7 | 14 | 187 | 9.41 | 0.05 |
| Ace followed by (Ace + Prov. Dil) | 37 | 215 | 10.27 | 0.05 |
| Ace | 2 | 46 | 2.19 | 0.05 |

Notation:
*BT for second solvent if preceded by Ace
**Includes BT; for Ace followed by other solvents, includes ET for Ace
***includes Ace bitumen for Ace followed by other solvents.

The methods of the present disclosure are not limited to the use of horizontal wellbores, e.g., of the kind normally used for SAGD, for the injection of the penetrating liquid. The penetrating liquid may be injected at a first point adjacent to the heavy-oil containing region by any suitable mechanism. Confirmation of fluid communication made at a second point beyond the heavy-oil containing region could be obtained by any suitable mechanism. Wellbores used for these purposes may be horizontal, vertical, deviated, slant, or any combination of horizontal, vertical, deviated and slant. Depending on the subterranean reservoir, the heavy-oil containing region through which fluid communication is to be established may have a thickness between the first and second points of as small as a 3 cm or less, or as much as thousands of cm. Any of the aforementioned ranges may be within a range that includes or is bounded by any of the preceding examples. The thickness employed for some reservoirs is often from 3 cm to about 90 cm. Any of the aforementioned ranges may be within a range that includes or is bounded by any of the preceding examples.

As utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

The articles "the", "a" and "an" are not necessarily limited to mean only one, but rather are inclusive and open ended so as to include, optionally, multiple such elements.

What is claimed is:

1. A method of establishing fluid communication between a first point and a second point, within a subterranean reservoir, separated by a heavy-oil containing region that enables heavy-oil production by a steam-assisted gravity drainage process, the method comprising:
   prior to performing the steam-assisted gravity drainage process:
      injecting a first penetrating liquid at a first injection pressure and at a first injection temperature into said subterranean reservoir at said first point;
      establishing fluid communication through said heavy-oil containing region by allowing said first penetrating liquid to penetrate into and completely through said heavy-oil containing region between said first point and said second point;
      wherein a first penetrating liquid temperature of said first penetrating liquid remains at or below said first injection temperature within the subterranean reservoir, and said first penetrating liquid is configured to dilute heavy oil, and comprises a first penetrating liquid polar compound, and a first penetrating liquid non-polar solvent; and
   commencing the steam-assisted gravity drainage process;
   wherein, following establishing fluid communication through said heavy-oil containing region, the method further comprises injecting a second penetrating liquid at a second injection pressure and at a second injection temperature into the subterranean reservoir at said first point and penetrating the second penetrating liquid through said heavy-oil containing region to said second point, said second penetrating liquid comprising a second penetrating liquid non-polar solvent; and
   wherein at least one of:
   said first penetrating liquid comprises a volatile compound that exists in liquid form at said first injection pressure and exists in vapor form at a lower pressure that is lower than the first injection pressure, and wherein after a period of injecting said first penetrating liquid, a first penetrating liquid pressure of the first penetrating liquid is reduced below said lower pressure; and
   said second penetrating liquid comprises a volatile compound that exists in liquid form at said second injection pressure and exists in vapor form at a lower pressure that is lower than the second injection pressure, and wherein after a period of injecting said second penetrating liquid, a second penetrating liquid pressure of the second penetrating liquid is reduced below said lower pressure.

2. The method of claim 1, wherein said first penetrating liquid polar compound has a Hansen Polarity value of at least 4.

3. The method of claim 1, wherein said first penetrating liquid non-polar solvent has a Hansen Polarity value of 1.5 or lower.

4. The method of claim 1, wherein said first penetrating liquid non-polar solvent comprises one of:
   an aromatic hydrocarbon compound;
   a compound selected from the group consisting of xylene and toluene;
   an aliphatic hydrocarbon;
   an alkane,
   a mixture of alkanes of C3 and higher;
   natural gas condensate; and
   n-heptane.

5. The method of claim 1, wherein said first penetrating liquid contains 10 to 90 wt % of said first penetrating liquid polar compound.

6. The method of claim 1, wherein injecting said first penetrating liquid comprises injecting a first amount of said first penetrating liquid and then injecting a second amount of the first penetrating liquid, and wherein said first amount is different from said second amount.

7. The method of claim 1, wherein said first penetrating liquid comprises a first penetrating liquid interfacial tension reducing agent.

8. The method of claim 7, wherein said first penetrating liquid interfacial tension reducing agent is a compound having the following Hansen Solubility Parameter values:
D=15-16;
P=4-7;
H=9-11.

9. The method of claim 7, wherein said first penetrating liquid interfacial tension reducing agent comprises one of:
a surfactant: and
a material selected from the group consisting of biodiesel and methyl ester ethoxylate.

10. The method of claim 1, wherein said second penetrating liquid non-polar solvent has a Hansen Polarity value of 1.5 or lower.

11. The method of claim 1, wherein said second penetrating liquid non-polar solvent comprises one of:
an aromatic hydrocarbon compound;
a compound selected from the group consisting of xylene and toluene;
xylene;
an aliphatic hydrocarbon,
an alkane;
a mixture of alkanes of C3 and higher;
natural gas condensate; and
n-heptane.

12. The method of claim 1, wherein said second penetrating liquid comprises a first penetrating liquid interfacial tension reducing agent.

13. The method of claim 12, wherein said first penetrating liquid interfacial tension reducing agent is a compound having the following Hansen Solubility Parameter values:
D=15-16;
P=4-7;
H=9-11.

14. The method of claim 12, wherein said first penetrating liquid interfacial tension reducing agent comprises one of:
a surfactant; and
a material selected from the group consisting of biodiesel fuel and methyl ester ethoxylate.

15. The method of claim 1, wherein said second penetrating liquid comprises a second penetrating liquid polar compound that is at least partially miscible with heavy oil.

16. The method of claim 15, wherein said second penetrating liquid polar compound has a Hansen Polarity value of at least 4.

17. The method of claim 1, wherein said first injection pressure is higher than a native pressure of said subterranean reservoir but below a pressure at which said subterranean reservoir is fractured.

18. The method of claim 1, further comprising at least one of:
injecting said first penetrating liquid into said subterranean reservoir at said first point via a wellbore in said subterranean reservoir; and
injecting said second penetrating liquid into said subterranean reservoir at said first point via a wellbore established in said subterranean reservoir.

19. The method of claim 18, further comprising at least one of:

producing said first injection pressure by establishing a head of said first penetrating liquid within said wellbore above said first point; and
producing said second injection pressure by establishing a head of said second penetrating liquid within said wellbore above said first point.

20. The method of claim 18, further comprising at least one of:
reducing said first injection pressure by allowing an upper level of said first penetrating liquid in said wellbore to descend, and periodically increasing said first injection pressure by supplementing said first penetrating liquid in said wellbore; and
reducing said second injection pressure by allowing an upper level of said second penetrating liquid in said wellbore to descend, and periodically increasing said second injection pressure by supplementing said second penetrating liquid in said wellbore.

21. The method of claim 1, further comprising periodically introducing a non-condensing gas at a gas pressure into said subterranean reservoir at said first point to displace water within said subterranean reservoir from said heavy-oil containing region.

22. The method of claim 1, wherein said heavy-oil containing region is between wellbores drilled into said subterranean reservoir, and wherein said first penetrating liquid and said second penetrating liquid are injected into said subterranean reservoir via one of: (i) one of said wellbores and (ii) a first wellbore and a second wellbore of said wellbores.

23. The method of claim 22, wherein said first injection pressure is one of temporarily different from said second injection pressure, differs from said second injection pressure over time, and is always different from said second injection pressure.

24. The method of claim 1, wherein said heavy-oil containing region is between an infill wellbore and a chamber within said subterranean reservoir from which heavy oil has previously been extracted, and wherein said first penetrating liquid is injected into said infill wellbore.

25. The method of claim 24, wherein injecting said first penetrating liquid continues until said first injection pressure decreases.

26. The method of claim 1, wherein first penetrating liquid polar compound selected from the group consisting of propyl acetate ester and dimethyl ether.

27. The method of claim 1, further comprising:
discontinuing the injection of the first penetrating liquid prior to commencing the steam-assisted gravity drainage process.

28. A method of assessing a subterranean reservoir for suitability for heavy oil production by a solvent-based production process, the method comprising:
completing wellbores into said subterranean reservoir, said wellbores positioned with a heavy-oil containing region lying between said wellbores;
injecting a first penetrating liquid at a first injection pressure and at a first injection temperature into said subterranean reservoir via one of said wellbores;
allowing said first penetrating liquid to remain in contact with said heavy-oil containing region for a predetermined period of time, said first penetrating liquid configured to dilute heavy oil and comprising a polar compound that is at least partially miscible with water;
determining an occurrence of penetration of said first penetrating liquid through said heavy-oil containing region; and declaring said subterranean reservoir suitable for heavy oil production by a solvent-based production process only if said occurrence is determined within said predetermined period of time.

29. The method of claim 28, further comprising:
commencing heavy oil production by the solvent-based production process within the subterranean reservoir;
wherein the determining an occurrence of penetration of said first penetrating liquid through said heavy-oil containing region; and declaring said subterranean reservoir suitable for heavy oil production by a solvent-based production process only if said occurrence is determined within said predetermined period of time; are performed prior to commencing the solvent-based production process within the subterranean reservoir.

* * * * *